March 23, 1965 S. OLDBERG 3,174,600
TEMPERATURE-RESPONSIVE FLUID CLUTCH
Filed May 18, 1961
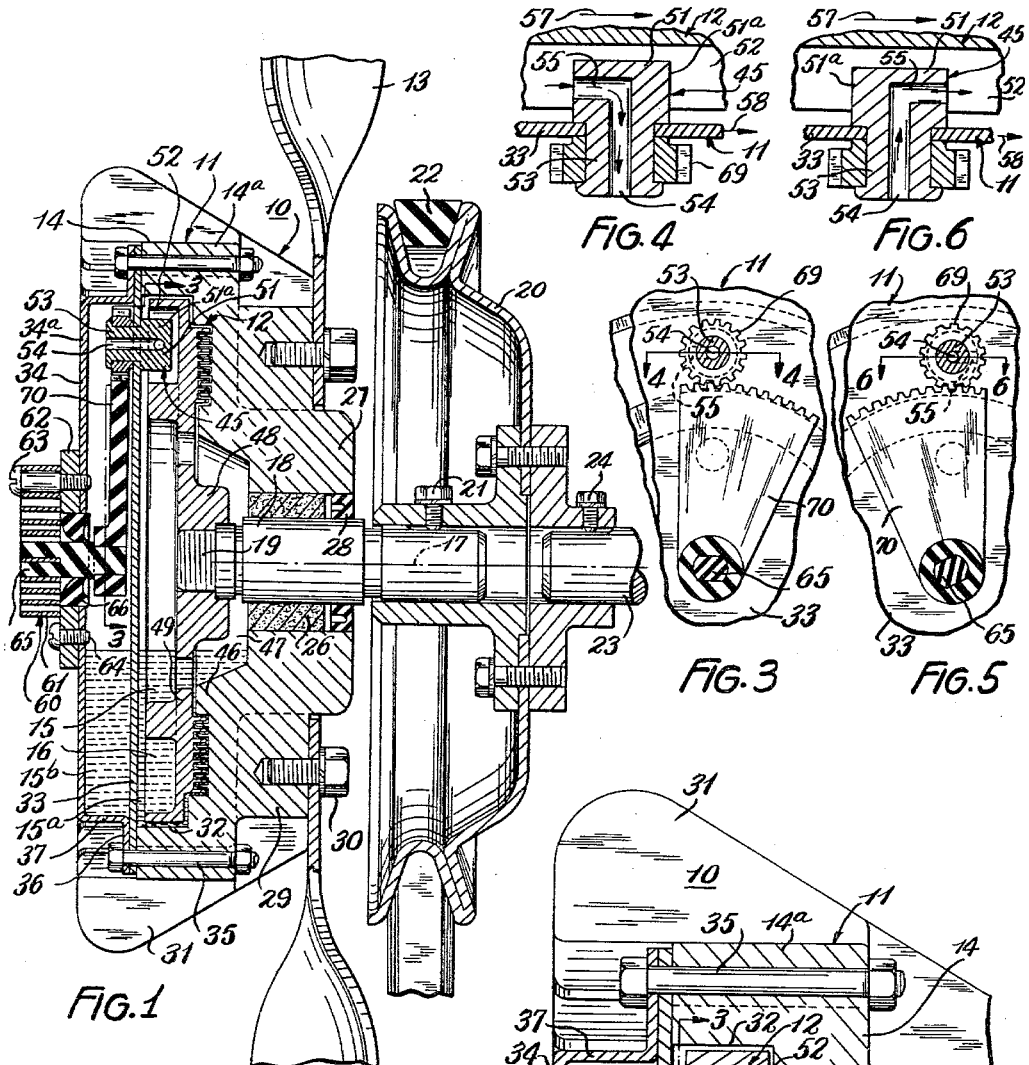
INVENTOR.
SIDNEY OLDBERG
BY
Williams, David, Hoffmann & Yount
ATTORNEYS United States Patent Office 3,174,600
Patented Mar. 23, 1965

3,174,600
TEMPERATURE-RESPONSIVE FLUID CLUTCH
Sidney Oldberg, 762 Puritan Ave., Birmingham, Mich.
Filed May 18, 1961, Ser. No. 110,983
18 Claims. (Cl. 192—58)

This invention relates to rotatable drive couplings of the type employing a viscous shear fluid between co-operating portions of relatively rotatable coupling members for transmitting torque between such members. Coupling devices of this type are usable in various places and for driving various different kinds of load devices, one such use being to drive an engine auxiliary device as, for example, the cooling fan of an internal combustion engine.

An object of this invention is to provide a novel drive coupling of the type employing viscous fluid in an intervening space between co-operating coupling elements of relatively rotatable power input and power output coupling members for transmitting torque between such members, and having rotation velocity responsive means operable to vary the amount of fluid in such space for correspondingly varying the amount of torque desired to be transmitted.

Another object is to provide a novel drive coupling of such a viscous fluid type wherein one of the coupling members is a housing having chamber means comprising a working chamber in which the co-operating coupling elements are located and an adjacent second chamber, and the rotation velocity responsive means is effective for causing a transfer of fluid from one to the other of the chambers to vary the amount of fluid in said intervening space and thereby vary the torque being transmitted.

A further object is to provide a novel viscous fluid drive coupling of the character indicated above wherein the rotation velocity responsive means is movable to different operating positions by a temperature responsive actuating means for causing the movement of fluid into and out of the intervening space and thus varying the amount of torque by a modulating action.

Still another object is to provide a novel drive coupling of the above-indicated viscous fluid type wherein the rotation velocity responsive means comprises a combined fluid pick-up and fluid-discharge means shiftable to pick-up and discharge positions for selectively causing movement of fluid from and into the intervening space between the coupling elements.

Additionally, this invention provides such a novel drive coupling of the viscous fluid type wherein the rotation velocity responsive means including passage means connecting the working chamber and the adjacent second chamber and is pivotally movable from one to the other of the pick-up and discharge positions, the passage means preferably being controlled by valve means responsive to the pivotal movement.

Other objects, novel characteristics and advantages of this invention will be apparent in the following detailed description and in the accompanying drawings forming a part of this specification and in which:

FIG. 1 is a vertical axial secton through a rotatable drive coupling of the viscous fluid type embodying the present invention;

FIG. 2 is a partial axial section corresponding with a portion of FIG. 1 and showing such portion on a larger scale;

FIG. 3 is a fragmentary transverse vertical section taken on section line 3—3 of FIG. 1 and further illustrating the rotation velocity responsive fluid transfer means;

FIG. 4 is a fragmentary section taken through a combined fluid pick-up and discharge member, as indicated by section line 4—4 of FIG. 3 and showing such member in its fluid pick-up position;

FIG. 5 is a fragmentary transverse vertical section similar to FIG. 3 but showing a different operating position of the rotation velocity responsive means;

FIG. 6 is a fragmentary section taken on section line 6—6 of FIG. 5 and showing the combined pick-up and discharge member in its fluid discharge position;

FIG. 7 is a fragmentary sectional view similar to that of FIG. 4 but showing a modified construction embodying a valve means; and FIG. 8 is a fragmentary sectional view taken on section line 8—8 of FIG. 7.

As representing one preferred embodiment of the invention, FIGS. 1 and 2 show a rotatable coupling device 10 of the viscous shear fluid type comprising relatively rotatable coupling members 11 and 12, one of which is operable as a power input member and the other of which is operable as a power output member. The coupling device 10 is adaptable for use in driving any of various kinds of load devices and is here shown as being used to drive an engine auxiliary device, namely a cooling fan 13 for the radiator of an internal combustion engine.

The coupling member 11 is shown in this case as being the power output member and comprises a housing 14 having chamber means 15 containing the viscous shear fluid 16, and the coupling member 12 is here shown as being the power input member and is located in the housing 14. The coupling members 11 and 12 are shown in the relative positions of outer and inner coupling members and are rotatable on a common rotation axis 17 which is also the rotation axis for the load device driven by the power output member, that is, the rotation axis of the fan 13.

The coupling device 10 is here shown as also comprising a power input shaft 18 having a threaded end portion 19 projecting into the chamber means 15 and on which the inner coupling member 12 is mounted. The axis 17 is also the rotation axis of the power input shaft 18. The power supply connection for the input shaft 18 is here shown as being a pulley 20 with which this shaft is connected, as by a set screw 21, and which pulley is adapted to be driven from a part of the engine, such as the crankshaft thereof, as by means of a suitable belt 22. The pulley 20 is shown as also being the power input member for a pump shaft 23 or the like on which the pulley is mounted and secured as by means of a set screw 24.

In addition to providing the power input means for the inner coupling member 12, the shaft 18 also serves as a journal member on which the housing 14 is rotatably mounted by a suitable bearing 26 disposed therebetween and located in the central hub portion 27 of the housing. A seal is provided for preventing the escape of the fluid 16 from the chamber means 15 by leaking along and around the shaft 18 and which seal is here shown as comprising a suitable annular packing 28 disposed around the shaft adjacent the rear end of the bearing 26.

The housing 14 is of a size and shape needed to accommodate the chamber means 15 and the inner coupling member 12, and includes an external annular mounting portion 29 extending around the hub portion 27 and to which the fan 13 is secured as by means of screws 30. The peripheral portion of the housing 14 is preferably provided with an annular series of heat-radiating blades 31 for dissipating heat which may be generated in the coupling device 10.

The housing 14 comprises a body 14ª having a cylindrical bore 32 extending axially thereinto, and includes transverse wall and cover members 33 and 34 secured to the body 14ᵃ on the front side thereof by clamping bolts 35. The wall member 33 is in the form of a disk-shaped plate extending across the bore 32 so that the portion of the chamber means 15 lying on the inner or right side of this wall member, as seen in FIG. 1, provides a working chamber 15ᵃ in which the inner coupling member 12 is located.

The cover member 34 is shown as being of a dished shape and comprises a transverse end wall 34ᵃ and a radial annular flange 36 connected with such end wall by an axial cylindrical portion 37. The flange 36 is clamped against the outer annular edge portion of the wall member 33 by the clamping bolts 35. The transverse end wall 34ᵃ of the cover member 34 is spaced from the wall member 33 so that the space therebetween forms a second chamber portion 15ᵇ of the chamber means 15.

Adjacent portions of the coupling members 11 and 12 are provided with torque transmitting elements comprising annular ridge and groove elements 41 and 42 connected with, or formed on, these members and disposed in an interengaged co-operative relation with an intervening space 44 therebetween to accommodate a portion of the viscous fluid 16 as a torque transmitting fluid. The ridge and groove elements 41 and 42 are located in the working chamber 15ᵃ and comprise a radially disposed series of these elements lying in a transverse plane extending substantially normal to the rotation axis 17.

The ridge and groove elements 41 and 42 are relatively rotatable during the operation of the drive coupling 10 and torque is transmitted between the coupling members 11 and 12 by the resistance to shear offered by the portion of the fluid 16 which is contained in the intervening space 44. The coupling fluid 16 can be any suitable viscous fluid such as a silicone oil.

The amount of torque which will be transmitted between the co-operating ridge and groove elements 41 and 42 will thus depend on the amount of coupling fluid 16 which is present in the intervening space 44, that is, upon the effective area of contact between such fluid and the surfaces of the ridge and groove elements. Variations in the amount of fluid 16 present in the intervening space 44 are produced, as needed, by the action of a rotation velocity responsive means 45 on the fluid in the chamber 15 in a manner which will presently be explained.

When coupling fluid 16 is supplied to the ridge and groove elements 41 and 42 so that the intervening space 44 is filled with such fluid for the full radial extent of the series of elements, the amount of torque transmitted between the coupling members 11 and 12 will be a maximum amount. On the other hand, when fluid is removed or expelled from the space 44 so that this space is filled with fluid for only a portion of the radial extent of the series of coupling elements 41 and 42, only a reduced amount of torque will be transmitted between the coupling members 11 and 12.

As shown in FIGS. 1 and 2 of the drawing, the ridge and groove elements 41 and 42 of the outer coupling member 11 are formed on a transverse annular wall portion 46 of the housing body 14ᵃ so as to be located at the inner end of the bore 32 and extend around a central axial recess 47 of this coupling member. The inner coupling member 12 has a hub portion 48 which is accommodated in the recess 47 and is provided with a threaded opening in which the threaded portion 19 of the shaft 17 is engaged.

The innner coupling member 12 also comprises a radially disposed annular wall portion 49 carried by the hub portion 48 and extending therearound. The ridge and groove elements 41 and 42 of the inner coupling member 12 are connected with, or formed on, one side of the radially disposed wall portion 49 so as to have the above-mentioned interengaged relation with the ridge and groove elements of the outer coupling member 12.

The rotation velocity responsive means 45 comprises a combined fluid pick-up and fluid-discharge member 51 having a head portion 51ᵃ operable in an annular raceway 52, of a channel-shaped form, in response to relative rotation between the coupling members 11 and 12. The combined pick-up and discharge member 51 is here shown as being carried by the outer coupling member 11 and mounted on the wall member 33 of the housing 14, and the raceway 52 is here shown as having been formed in the inner coupling member 12 on the side thereof which faces axially toward the wall member 33, that is to say, on the side of the radial wall portion 49 opposite from the side on which the ridge and groove elements 41 and 42 are located.

The combined fluid pick-up and discharge member 51 also has a stem portion 53 extending through, and mounted in, an opening of the wall member 33 so that this combined member is pivotally movable on such wall member. The combined member 51 has passage means therein comprising axial and radial passages 54 and 55, of which the axial passage 54 communicates with the chamber 15ᵇ. The passage 55 is an angularly disposed passage located in the head portion 51ᵃ and communicates with the raceway portion 52 of the working chamber 15ᵃ.

The construction and location of the combined fluid pick-up and delivery means 45 is shown to best advantage in FIGS. 4 and 6 from which it will be seen that the member 51 is in the nature of a combined scoop and induction member and has two different operating positions, namely a pick-up position shown in FIG. 4 and a discharge position shown in FIG. 6. The direction of rotation of the power input coupling member 12 is a clockwise direction as indicated by the arrow 57. The direction of rotation of the power output coupling member 11 is likewise a clockwise rotation as indicated by the arrow 58.

The resistance to rotation offered by the fan 13 will cause the outer coupling member 11 to lag behind the inner coupling member 12 so that the relative rotation between the coupling members will be a clockwise rotation of the inner coupling member relative to the outer coupling member. This clockwise relative rotation will produce movement of the raceway 52 in a direction to cause a fluid-impact pick-up action by which fluid 16 of the raceway will be carried thereby and impacted against the pick-up member 51 and caused to enter the angularly disposed passage 55 and flow therefrom through the axial passage 54 into the chamber 15ᵇ.

It will accordingly be seen that when the pick-up member 51 is in its FIG. 4 pick-up position, it will cause fluid to be transferred from the working chamber 15ᵃ to the second chamber 15ᵇ with the result that fluid will be removed from the intervening space 44 and cause a decrease in the coupling action between the ridge and groove elements 41 and 41, and consequently, a decrease in the amount of torque being transmitted to the coupling member 11 and a decrease in the speed at which the fan 13 is driven. The removal of fluid from the intervening space 44 during this pick-up action of the member 51 is assisted by centrifugal force acting on the fluid in the intervening space 44, inasmuch as centrifugal force will cause fluid to flow in a radial direction out of the intervening space and around the periphery of the inner coupling member 12 into the raceway 52.

On the other hand, when the pick-up member 51 is in the operating position shown in FIG. 6, the clockwise relative rotation of the inner coupling member 11 will move the raceway 52 and the fluid contained therein past the pick-up member in a direction to produce a lower pressure or suction effect in the angularly disposed passage portion 55 by which fluid will be caused to flow from the second chamber 15ᵇ back into the working chamber 15ᵃ. This transfer of fluid into the working chamber 15ᵃ will cause an increase in the amount of fluid in the intervening space 44 and a corresponding increase in the amount of torque being transmitted from the inner coupling member 12 to the outer coupling member 11 and an increase in the speed of rotation of the fan 13.

For shifting the pick-up member 51 from one to the other of its pick-up and discharge positions, the drive coupling 10 is provided with temperature responsive means 60 which is connected with the pick-up member and operably effective thereon as will now be described. The temperature responsive means 60 is here shown as comprising a bimetal spiral spring member 61 mounted on a flat annular base 62 which is secured against the front surface of the cover member 34 by a pair of mounting screws 63 and 64. The mounting screw 63 also forms an anchor member for the outer end of the bimetal spring 61. The inner end of the bimetal spring is secured to a shaft 65 which is pivoted in a bushing 66 supported by the base 62 so as to extend into or through the opening of the cover member 34.

The bimetal spring 61 is located in an exposed position on the front side of the cover member 34 of the housing 14 so as to be contacted by the stream of heated air leaving the radiator of the internal combustion engine with which the fan 13 is associated. The bimetal spring 61 will accordingly be subjected to temperature changes in accordance with the different temperatures of the radiator air and, when the bimetal spring is subjected to a temperature increase, the shaft 65 will be rotated in one direction and when the bimetal spring is subjected to a temperature decrease, the shaft will be rotated in the opposite direction.

The rotative movements of the shaft 65 are utilized to actuate the combined fluid pick-up and delivery member 51 to its two different operating positions referred to above. For this purpose the member 51 is provided with a gear 69 which is suitably secured on the stem 53 and the shaft 65 is provided with a gear sector 70 which is secured on this shaft and acts as a driving member for the gear 69.

Rotation of the shaft 65 by the bimetal spring 61 as the result of cooling and contraction of the spring will swing the sector 70 in a direction to shift the pick-up member 51 to its pick-up position of FIG. 4 to produce the above-explained decrease in the amount of fluid in the intervening space 44 for correspondingly decreasing the amount of torque being transmitted to the outer coupling member 11. The fan 13 will accordingly be driven at a slower rate to produce a smaller flow of cooling air through the vehicle radiator.

Similarly, rotative movement of the shaft 65 as the result of heating and expanding of the bimetal spring 61 will swing the sector 70 in a direction to shift the pick-up member 51 to its discharge position shown in FIG. 6 whereupon the amount of fluid in the intervening space 44 will be increased in the manner explained above for a corresponding increase in the amount of torque being transmitted to the coupling member 11 whereby the fan 13 will be driven at a faster speed for moving an increased volume of air through the cooling radiator.

In order to minimize any transfer of heat from the inner portions of the coupling device 10 to the temperature responsive means 60 which might render the control function of the latter erratic, the shaft 65, bushing 66 and gear sector 70 are made of material which will retard such heat transfer. For thus achieving this purpose the members just mentioned are preferably nonmetallic in character as by being made of a suitable plastic such as nylon.

FIGS. 7 and 8 of the drawings show a modified construction which can be embodied in the drive coupling device 10 and, when so used, provides a valve means 75 in a combined fluid pick-up and fluid-discharge means 45ª. The modified construction of FIGS. 7 and 8 is used with the same outer and innercoupling members 11 and 12 but, in this case, the combined pick-up and discharge means 45ª includes a hollow boss 76 formed on the wall member 33 so as to extend into the raceway 52.

The hollow boss 76 provides a valve chamber 77 in which a valve member 78, connected with the gear 69, is rotatably operable and is retained therein as by means of a snap ring 79. The valve member 78 is provided with an angularly disposed passage 80 located at the inner end of an axial passage 81. The angularly disposed passage 80 co-operates with the valve ports 82 and 83 provided in the hollow boss 76 on diametrically opposites sides thereof. The rotatable valve member 78 is also provided with a flat side 84 thereon so that intervening space between the rotatable valve member and the wall of the hollow boss 76 will provide a connecting chamber 85 for connecting the angularly disposed passage 80 with one or the other of the valve ports 82 and 83, depending upon the rotative position to which the valve member 78 has been shifted.

The position in which the valve member 78 is shown in FIGS. 7 and 8 is the discharge position of the valve member which will cause the combined pick-up and discharge means 45ª to return fluid to the working chamber 15ª from the second chamber 15ᵇ for the same purpose as was described above for the combined pick-up and discharge means 45, that is, to cause the fan 13 to be driven at increased speed.

When the valve member 78 is rotated to the position in which the angularly disposed passage 80 is connected with the valve port 82, the combined pick-up and discharge means 45ª will operate to transfer fluid from the working chamber 15ª to the second chamber 15ᵇ as the result of an impact action of fluid in the raceway 52 against the side of the hollow boss 76 having the valve port 82 therein. This impact and pick-up position for the valve member 78 will then correspond with the impact and pick-up position shown in FIG. 4 for the member 51 and will result in fluid moving into the angularly disposed passage 80 and thence through the axial passage 81 into the second chamber 15ᵇ to thereby cause removal of fluid from the intervening space 44 of the coupling elements 41 and 42 and a resulting decrease in the amount of torque transmitted and a decrease in the speed at which the fan 13 is driven.

It will be understood, of course, that the gear 69ª of the valve member 78 is rotatably driven from a temperature responsive device, such as a bimetal spring having the same form and location as the spring 61 of the above-described temperature responsive device 60.

From the accompanying drawing and the foregoing detailed description it will now be readily understood that this invention has provided a simple and practical embodiment of a novel rotatable coupling device of the viscous shear fluid type which can be used to advantage for driving an engine auxiliary, such as a cooling fan associated with a vehicle radiator, but can also be used for driving various other kinds of load devices. By the use of the fluid transfer means comprising the rotation velocity responsive combined fluid pick-up and fluid-discharge means, the amount of fluid effective between the coupling elements can be varied with a modulating action in response to temperature changes, so that the amount of torque transmitted between the driving and driven coupling members will be varied automatically in accordance with the desired speed at which the load device needs to be driven.

Although the rotatable coupling device of this invention has been illustrated and described herein to a somewhat detailed extent it will be understood, of course, that the invention is not to be regarded as being limited correspondingly in scope but includes all changes and modifications coming within the terms of the claims hereof.

Having described my invention, I claim:

1. A drive coupling comprising; relatively rotatable coupling members including a housing as a first coupling member having chamber means therein and a second coupling member located in said chamber means; annular ridge and groove elements on said coupling members and disposed in an interengaged relation with an intervening shear space therebetween; viscous shear fluid in said chamber means and adapted, when supplied to said space, to transmit torque between said coupling members; one of said coupling members having an annular raceway therein adapted to contain a portion of said fluid; and rotation velocity responsive fluid flow producing means on the other coupling member for operation in said raceway during relative rotation between said coupling members and effective to cause fluid to be supplied to or removed from said space for varying the amount of torque being transmitted; said flow producing means comprising deflector means shiftable on said other coupling member between fluid pick-up and fluid-discharge positions in said raceway.

2. A drive coupling comprising; relatively rotatable coupling members including a housing as a first coupling member having chamber means therein and a second coupling member located in said chamber means; annular ridge and groove elements on said coupling members and disposed in an interengaged relation with an intervening shear space therebetween; viscous shear fluid in said chamber means and adapted, when supplied to said space, to transmit torque between said coupling members; one of said coupling members having an annular raceway therein adapted to contain a portion of said fluid; rotation velocity responsive fluid flow producing means on the other coupling member for operation in said raceway during relative rotation between said coupling members and effective to cause fluid to be supplied to or removed from said space for varying the amount of torque being transmitted; said flow producing means comprising a deflector member shiftable on said other coupling member between fluid pick-up and fluid-discharge positions in said raceway; and temperature responsive means connected with said deflector member for shifting the same from one to the other of said positions.

3. A drive coupling comprising; relatively rotatable coupling members including a housing as a first coupling member having chamber means therein and a second coupling member located in said chamber means; annular ridge and groove elements on said coupling members and disposed in an interengaged relation with an intervening shear space therebetween; viscous shear fluid in said chamber means and adapted, when supplied to said space, to transmit torque between said coupling members; one of said coupling members having an annular raceway therein adapted to contain a portion of said fluid; rotation velocity responsive fluid flow producing means on the other coupling member for operation in said raceway during relative rotation between said coupling members and effective to cause fluid to be supplied to or removed from said space for varying the amount of torque being transmitted; said flow producing means comprising a deflector member pivotally shiftable on said other coupling member between fluid pick-up and fluid-discharge positions in said raceway; temperature responsive means including a movable actuating member; and gear means connecting said actuating member with said deflector member for shifting the latter from one to the other of said positions.

4. In a drive coupling for an engine auxiliary or other load device; a pair of relatively rotatable coupling members operable as power input and power output members and having a common rotation axis; one of said members being a housing having chamber means therein and the other being located in said housing; said chamber means comprising a working chamber and an adjacent second chamber; annular ridge and groove coupling elements carried by said coupling members and having an interengaged relation with an intervening space therebetween; torque transmission fluid of the viscous shear type in said chamber means and space and effective between said elements for transmitting torque from one to the other of said coupling members in accordance with the amount of fluid in said space; said coupling elements being located in said working chamber and surrounding said axis and lying substantially in a rotation plane extending in a transverse normal relation to said axis so that centrifugal force will be effective for moving fluid out of said space; rotation velocity responsive means operable in response to said relative rotation for moving fluid from said second chamber to said working chamber for causing a return movement of fluid into said space and from said working chamber to said second chamber; said one coupling member having partition wall means located between said working chamber and second chamber; said velocity responsive means comprising a combined fluid pick-up and said fluid-discharge means on said wall means and operable to cause flow of fluid from said working chamber and to said working chamber; said other coupling member having an annular raceway therein and said combined means being operable in said raceway.

5. A drive coupling according to claim 4 wherein said raceway is located on said second coupling member; said deflector means being located on said first coupling member and being shiftable between fluid pick-up and fluid-discharge positions in said raceway.

6. A drive coupling according to claim 4 wherein said raceway is located on said second coupling member and on the side thereof facing said partition wall; said deflector means being mounted on said partition wall and being rotatably shiftable between fluid pick-up and fluid-discharge positions in said raceway.

7. A drive coupling according to claim 6 and comprising valve means associated with the deflector means for controlling said passage means and being responsive to the rotary shifting of said deflector means.

8. A drive coupling according to claim 4 wherein said deflector means is shiftable between fluid pick-up and fluid-discharge positions in said raceway; and temperature responsive means operable to shift said deflector means from one to the other of said positions.

9. A drive coupling comprising first and second coupling members relatively rotatable on a common axis; said first coupling member comprising a housing having a working chamber and a reservoir chamber and a partition wall between said chambers; said second coupling member being located in said working chamber; said coupling members having coupling portions in a cooperative relation with an intervening shear space therebetween; shear-type torque transmission fluid in said chambers and space and effective between said coupling portions for transmitting torque from one to the other of said coupling members and producing a coupling action dependent upon the amount of said fluid present in said space; said second coupling member having an axially facing annular raceway located on the side thereof presented toward said partition wall; said raceway extending around said rotation axis and containing a portion of said fluid; deflector means on said partition wall and having a flow passage for transfer of fluid between said chambers to vary the amount of said fluid in said space; said deflector means extending into said raceway and being rotatably shiftable between fluid pick-up and fluid-discharge positions; lever means operably connected with said deflector means; and temperature responsive means effective to swing said lever means for shifting said deflector means from one to the other of said positions.

10. A drive coupling according to claim 9 and comprising gearing as the operating connection between said lever means and deflector means.

11. A drive coupling according to claim 9 and comprising pivot means on said first coupling member and having said lever means connected therewith; said temperature responsive means being connected with said lever means through said pivot means.

12. A drive coupling as defined in claim 9 wherein said housing includes cover means spaced from said partition wall; pivot means on said cover means and having said lever means connected therewith; said temperature responsive means being located on the external side of said cover means and connected with said lever means through said pivot means.

13. A drive coupling comprising; relatively rotatable coupling members including a first coupling member having reservoir and working chamber means therein and a second coupling member located in said working chamber means; surface portions on said coupling members disposed with an intervening shear space therebetween; said shear space being located in said working chamber; viscous shear fluid in said reservoir chamber means and adapted, when supplied to said space, to transmit torque between said coupling members; and means effective to cause fluid to be supplied to said space and removed from said space to vary the torque transmitted between the coupling members including fluid conducting passageway means for conducting fluid to said space and conducting fluid from said space, and a shiftable flow producing deflector means on said first coupling member and movable between a first position projecting into said working chamber for effecting fluid flow through said passageway means from said space and a second position allowing for fluid flow through said passageway means into said space.

14. A drive coupling as defined in claim 13 wherein said flow producing deflector means is pivotally supported on said first coupling member and means is provided for pivoting said deflector means between its said positions.

15. A drive coupling as defined in claim 13 wherein said flow producing deflector means is moved between said first and second positions by a temperature responsive means.

16. A drive coupling comprising first and second coupling members relatively rotatable on a common axis; said first coupling member comprising a housing having a working chamber and a reservoir chamber and a partition wall between said chambers; said second coupling member being located in said working chamber; said coupling members having coupling surface portions in a co-operative relation with an intervening shear space therebetween; shear-type torque transmission fluid in said chambers and space and effective between said coupling surface portions for transmitting torque from one to the other of said coupling members and producing a coupling action dependent upon the volume of said fluid present in said space; passage means connecting said reservoir chamber with said working chamber for flow of the fluid therebetween to vary the volume of fluid in said space; and deflector means on said first coupling member and shiftable from a first position projecting into said working chamber and effecting flow of fluid from the working chamber to the reservoir chamber to a second position allowing for fluid flow through said passage means from the reservoir chamber to the working chamber.

17. A drive coupling comprising first and second relatively rotatable coupling members; said first coupling member comprising a housing having working and reservoir chamber means therein; said second coupling member being located in said working chamber means; said coupling members having coupling surface portions with an intervening shear space therebetween; shear-type torque transmission fluid in said reservoir chamber means and effective when in said shear space for transmitting torque from one to the other of said coupling members and producing a coupling action dependent upon the volume of said fluid present in said space; a fluid conducting passage connecting said reservoir chamber with said working chamber of flow of fluid therebetween to vary the volume of fluid in said space; and flow producing deflector means on said first coupling member and shiftable from a first position projecting into said working chamber for effecting fluid flow through said passage from the working chamber to the reservoir chamber to a second position allowing for fluid flow through said passage from the reservoir chamber to the working chamber.

18. A drive coupling comprising; relatively rotatable coupling members including a first coupling member having chamber means therein and a second coupling member located in said chamber means; surface portions on said coupling members disposed with an intervening shear space therebetween; viscous shear fluid in said chamber means and adapted, when supplied to said space, to transmit torque between said coupling members; and means for supplying fluid to said space and removing fluid from said space to vary the torque transmitted between the coupling members including a fluid conducting passage through which fluid is supplied to said space and through which fluid is removed from said space, and a shiftable flow producing deflector means supported by said first coupling member and movable between a first position wherein it is operable to produce fluid flow through said passage from said space upon relative rotation of the coupling members, and a second position allowing for fluid flow through said passage into said space, said fluid conducting passage comprising the only fluid conducting passage leading to said space.

References Cited in the file of this patent
UNITED STATES PATENTS

| | | |
|---|---|---|
| 1,798,431 | McWilliams | Mar. 31, 1931 |
| 2,289,440 | Kugel | July 14, 1942 |
| 2,627,167 | Becker | Feb. 3, 1953 |
| 2,902,127 | Hardy | Sept. 1, 1959 |
| 2,948,268 | Roper et al. | Aug. 9, 1960 |
| 2,989,851 | Sinclair | June 27, 1961 |
| 3,055,473 | Oldberg et al. | Sept. 25, 1962 |